Dec. 8, 1959     L. VALENTINI     2,915,785
MANUFACTURING MATS FROM RUBBER DERIVATIVES
Filed Oct. 3, 1952

INVENTOR.
LUCIANO VALENTINI
BY
ATTORNEY

# United States Patent Office 2,915,785
Patented Dec. 8, 1959

2,915,785

MANUFACTURING MATS FROM RUBBER DERIVATIVES

Luciano Valentini, Turin, Italy

Application October 3, 1952, Serial No. 312,889

Claims priority, application Italy October 4, 1951

2 Claims. (Cl. 18—47.5)

This invention provides a simple and inexpensive method of manufacturing improved attractive mats from rubber derivatives.

The method consists in moulding a mat provided with a number of projections on its upper face, and submitting the top of the projections to a grinding operation. The grinding operation gives a dull or chamoised aspect to the top of the projections, which contrasts with the smooth surface of the shallow parts between the projections and gives to the mat a pleasing aspect.

According to a further improvement, the top face of the mat is first fully coated with varnish, then ground. Grinding leaves the top of the projections free from varnish and resembling chamois leather. This enhances the contrast with the shallow portions.

The improved process can be used in connection with mats of any type, such as mats for automobile floors, bath-rooms and the like.

The invention shall now be described with reference to the accompanying drawing, wherein.

1 denotes a mat of rubber or rubber derivatives, having a plurality of projections 2.

The mat is preferably made up of a vulcanised mix of rubber and vegetable fiber material, as described in my co-pending patent application Serial No. 116,225 filed September 9, 1949, now Patent No. 2,637,752 dated May 5, 1953.

After moulding the mat, the projections are subjected to a grinding operation which confers to them a dull velvety or chamoised appearance contrasting with the smooth surface of the shallow portions 3 between the projections.

The contrast is enhanced when the mat is made of two layers from different rubber mixes, the layer carrying the projections being obtained from a mix of rubber and vegetable fiber material, while the underlying layer is made of another rubber mix.

Figure 1:
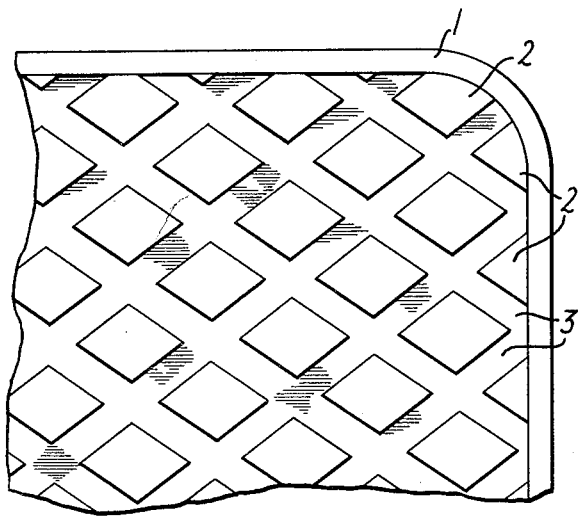
Figure 1 is a part top view of a mat obtained by the improved method.
Figure 2:
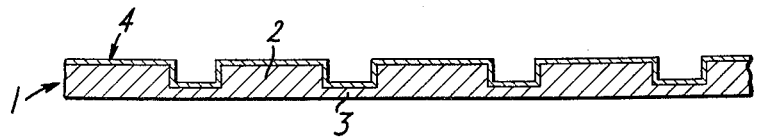
Figure 2 is a sectional view of mat manufactured according to a further improvement, before the grinding operation.
Figure 3:
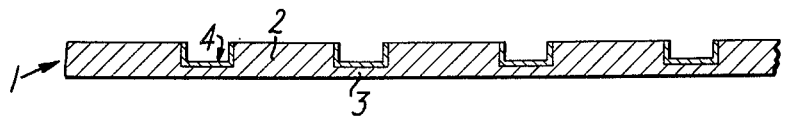
Figure 3 is a sectional view similar to Figure 2 after the grinding operation.

In the example shown in Figures 2 and 3, the top face of the mat is coated with a layer of varnish 4 covering both the projections 2 and bottom 3.

Grinding removes the coating from the top face of the projections 2, which gives a marked contrast between the chamoised top surface of the projections and the surface of the coated portion.

What I claim is:

1. A method of making flexible mats for floors which comprises, molding a mixture of rubber and vegetable fiber to form a flexible laminar body having projections extending from its upper surface with grooves formed therebetween, coating the entire upper surface of said body with a layer of varnish, and grinding only the top surfaces of the projections to remove the varnish therefrom and to impart to said projections a velvety surface, the coating of varnish remaining in the grooves between the projections and on the side walls of said projections providing a shiny surface to contrast with the velvety surface of the projections and said varnish coating providing a smooth, dirt-repellent area.

2. A method of making flexible mats for floors which comprises, molding a mixture of rubber and vegetable fiber to form a flexible laminar body having projections extending from its upper surface with grooves formed therebetween, and molding a different rubber mixture integrally with said first-named mixture to underlie said body to form the complete mat, coating the entire upper surface of said body with a layer of varnish, and grinding only the top surfaces of the projections to remove the varnish therefrom and to impart to said projections a velvety surface, the coating of varnish remaining in the grooves between the projections and on the side walls of said projections providing a shiny surface to contrast with the velvety surface of the projections and said varnish coating providing a smooth, dirt-repellent area.

References Cited in the file of this patent

UNITED STATES PATENTS

| | | |
|---|---|---|
| 1,560,941 | Miller | Nov. 10, 1925 |
| 1,804,920 | Edwards | May 12, 1931 |
| 1,830,141 | Stone | Nov. 3, 1931 |
| 1,881,803 | Mattison | Oct. 11, 1932 |
| 1,964,348 | Gammeter | June 26, 1934 |
| 2,624,700 | Morrison | Jan. 6, 1953 |